June 17, 1952    J. C. KREJCI    2,600,994
CARBON BLACK PROCESS AND APPARATUS
Filed Nov. 6, 1944
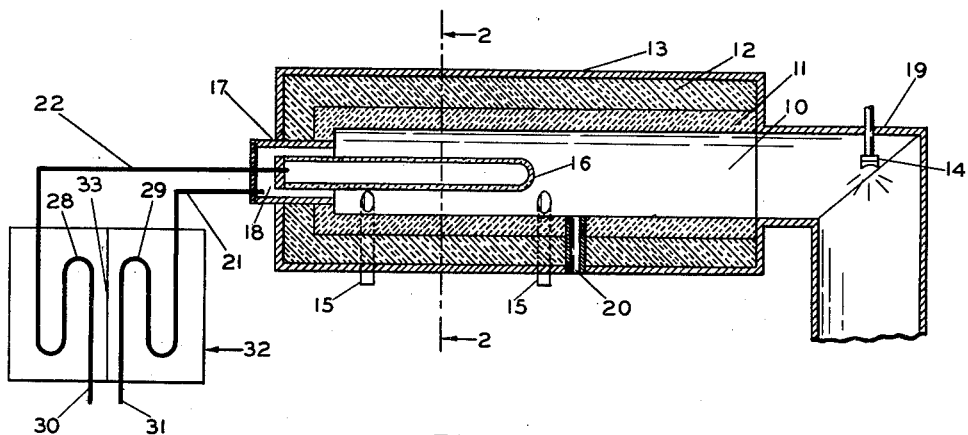
FIG. 1
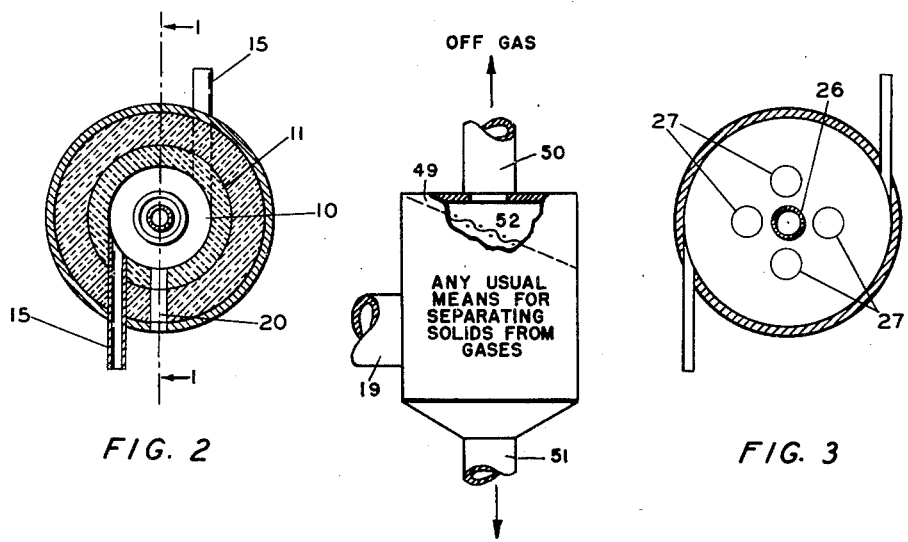
FIG. 2
OFF GAS
49
50
52
ANY USUAL
MEANS FOR
SEPARATING
SOLIDS FROM
GASES
19
51
CARBON BLACK
FIG. 6
FIG. 3
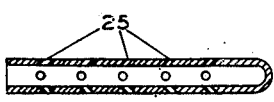
FIG. 4
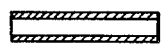
FIG. 5
INVENTOR
J. C. KREJCI
BY Hudson & Young
ATTORNEYS Patented June 17, 1952

2,600,994

UNITED STATES PATENT OFFICE 2,600,994

CARBON BLACK PROCESS AND APPARATUS

Joseph C. Krejci, Phillips, Tex., assignor to Phillips Petroleum Company, a corporation of Delaware Application November 6, 1944, Serial No. 562,115

15 Claims. (Cl. 23—209.8)

This invention relates to the manufacture of carbon black. In one of its more specific aspects it relates to an improvement in the furnace and process of manufacturing carbon black disclosed in my copending application, Serial No. 424,084, filed December 22, 1941, and now issued as Patent No. 2,375,795 of which this application is a continuation-in-part. In this application the invention resides mainly in means and a process for furnishing sufficient heat in carbon black producing reaction chambers of large diameter to produce blacks having special properties as well as to produce blacks having properties similar to the carbon black made according to the above mentioned copending application.

In the past most of the carbon black used in the manufacture of tread stocks for automotive tires was made by the so called "channel" process. In this process a hydrocarbon gas, and for the most part a lean natural gas was burned incompletely by a multitude of small, individual gas burners. It has long been known that when a cold object is brought into a gas flame the object becomes wet with condensed moisture and coated with finely divided carbon. This principle is utilized in the channel process in which the incompletely burning gas flames from many individual burners are allowed to impinge upon "channel" iron, upon which the carbon black deposits. The irons are kept sufficiently warm, however, that the deposited carbon is dry. To produce carbon black on a commercial scale requires thousands of these individual burners and many channels for collection of the black.

The manufacture of high quality carbon black according to my original process as disclosed in my above identified copending application, solves the "multi-apparatus" problem. One of the reactor furnaces produces as much carbon black per day as many thousands of burners in the conventional channel black plant. How many thousands of burners are replaced by one reactor furnace, of course, depends upon the size of the furnace. One relatively large size furnace, 15 inches inside diameter and 10 feet in length has been used, an intermediate sized furnace may be one 9½ inches diameter and about 6 feet in length. I have used still smaller furnaces. In consideration of the size of many kinds and types of commercial equipment, a furnace of 15 inches inside diameter and 10 feet in length is far from a large piece of equipment. While a furnace of this size produces large quantities of carbon black per unit, a large size commercial plant would still need a number of such units. I have now discovered a method for operating still larger reactor units for the production of super-quality carbon black such as is fully described in my copending application. An advantage of larger units will be immediately realized in lower investment and construction costs in the building of large scale plants. Such large scale plants are now needed to supply carbon black for the wartime production of rubber products mostly vehicle tires. This type of carbon black is especially useful since it can be used in the processing of synthetic rubbers as well as of natural rubber.

By maintaining sufficiently high temperature throughout the reaction chamber I am able to operate abnormally large furnaces, and I found means and a method for carrying out this operation.

One object of my invention is to provide large scale equipment for the commercial manufacture of carbon black.

Another object of my invention is to provide large scale equipment so as to reduce the number of operating units required to produce a given amount of carbon black per unit of time.

Still another object of my invention is to provide apparatus for making large quantities of carbon black, the operation of which apparatus can be carried out at a minimum of cost.

Yet another object of my invention is to adapt the helical flame carbon black process to the production of special types of carbon blacks in reactors of large diameter.

Many other objects and advantages of my invention will be apparent to those skilled in the art from a careful study of the following disclosure taken in conjunction with the attached drawing in which:

Figure 1 is a diagrammatic longitudinal section of a reactor chamber showing the centrally located, porous, closed end tube, the section being taken on line 1—1 of Figure 2.

Figure 2 is a diagrammatic cross section of the reactor chamber showing the porous tube, and taken on the line 2—2 of Figure 1.

Figure 3 is a cross section of the reactor chamber showing as a second embodiment the central porous tube and different means for introduction of reactant hydrocarbon into the chamber.

Figure 4 shows another embodiment of a porous tube.

Figure 5 shows still another embodiment of a porous tube.

Figure 6 is an elevational view of a carbon black separating means known to the prior art and adapted to be used to collect carbon black from the effluent gases in pipe 19 of Figure 1.

Referring now to the drawing and especially to Figures 1 and 2, the cylindrical reaction chamber 10 has a lining 11 of highly refractory material such as sillimanite or alundum. Between this refractory liner 11 and a cylindrical steel shell 13 is a layer of insulation 12. The chamber is equipped with one or more inlet tubes 15 extending through the chamber wall and terminating in an oval-shaped opening so that gas passing through the opening enters the chamber in a direction tangential to the inside cylindrical surface and approximately perpendicular to the longitudinal axis. Temperature within the chamber may be measured through one or more side wall openings, as at 20. At the inlet end, the chamber is equipped with an inlet tube 16 which may be approximately in line with the longitudinal axis. Surrounding this tube 16 is another and larger tube 17, the inner end of which is approximately flush with the inner surface of the end wall while the outer end may be flush with or extend outward beyond the outer surface of the end wall. The tubes 16 and 17 are of such diameter as to leave an appreciable annular space 18 between them, this annular space is sufficiently large as to serve as a passageway or inlet for gaseous or vaporous hydrocarbon charge stock for operation of the reactor. At the downstream end the furnace is fully open and unobstructed. A water spray 14 is located in a large tube 19 just beyond the discharge end of the furnace.

The tube 16 should preferably be made of a porous, refractory material so that air for central zone combustion and heating purposes can be made to pass through the walls of the tube without excessive pressure drop. Pipe 22 conducts air from a source not shown, to the porous tube 16.

In the operation of the carbon black producing reactor, according to my invention, a mixture of fuel gas, such as natural gas and air is introduced through the tangential inlet tubes 15 into the furnace. This combustible mixture burns and furnishes reaction heat. The tangential gas velocity is high and causes the burning gas and combustion products to adhere to the inside surface of the chamber due to the centrifugal force. Since the downstream or discharge end of the reactor is the only opening for discharge of material, this tangential gas follows a helical path from its point of inlet to the outlet end of the furnace. This helical path is substantially the same regardless of the number of points of inlet of the tangential fuel. Figure 1 shows two tangential burners, but there may be only one, as for example in chambers of small diameter, or three or four or even more for large diameter reactors. The number and position of the tangential burners may need be determined for each size, etc., of reactor, the ultimate aim being not to permit deposition of carbon on the furnace walls and to furnish reaction heat. The tangential gas may be air or oxygen only.

This fuel gas due to its high inlet velocity and relatively great centrifugal force, as mentioned above, maintains a layer or coating of flame and combustion products on the furnace inner wall. This layer then acts as a partition between the furnace walls and reactant materials passing longitudinally through the central portion of the reactor, the operation of which is hereinafter fully explained.

The reactant hydrocarbon stream coming from inlet pipe 21 flows through the annular space 18 into the reactor in a downstream direction, that is, directly from the inlet to the outlet of the chamber. This reactant hydrocarbon material is the intended source of the carbon black. Air from pipe 22 enters tube 16 and diffuses through the walls thereof, and causes a burning of some of the reactant hydrocarbon to furnish additional heat at a point near the center of the chamber. The reactant hydrocarbon stream enters the chamber in this embodiment substantially as a hollow cylinder. When air diffuses through the diffusion tube 16, then oxygen from this air supports partial combustion with reactant hydrocarbon from the inner portion of said hollow cylinder to produce heat by combustion. This heat is therefore produced at a point farthest from any other source of heat. In a copending application for patent, Serial No. 577,180, filed February 10, 1945, now abandoned, I describe a reactor furnace of 15 inches inside diameter. Assuming a helical layer thickness of 2½ inches, the central, carbon black forming region or core has a diameter of about 10 inches. That is, this 10 inches is the approximate distance between two sources of heat, or the distance might be termed the "effective" distance between the furnace walls. By using a central porous tube, as tube 16 in Figure 1, having an outside diameter of, say, 3 inches, and assuming a tangential layer thickness of 2½ inches and an effective reactant hydrocarbon thickness of 10 inches, these figures total to an overall furnace diameter of about 28 inches. A carbon black reactor furnace of this diameter and corresponding length is indeed a very large furnace. This diameter of 28 inches is approximately double the 15 inch furnace, mentioned above. If the furnace length is likewise doubled, the volume is then increased eight fold, and the carbon produced per unit of time may well be eight times that produced by the 15 inch furnace. Assuming the 15 inch furnace to produce 4 tons per day, then the 28 inch reactor should produce about 32 tons per day, which quantity is truly a large amount of carbon black. While a tangential layer thickness of 2½ inches is mentioned this thickness may vary over a wide range.

Figure 6 shows any usual means 49 for separating solids from gases which may be applied to the downstream end of pipe 19 of Figure 1, it being obvious that the carbon black is separated from the gas in the course of its production. Means 49 may be a fabric bag separator containing a screen 52 as shown in separator 11 of Figure I of Brownlee 1,925,130 of September 5, 1933, in which case the effluent gases from pipe 19 enter separator 49 and the gases pass up through screen 52 and out pipe 50 while the carbon black may be collected at 51. Said Brownlee patent shows other means 23 in Figure II thereof, many types of means for separating solids from gases being long in use in the art of making carbon black in furnaces of the general type disclosed in the present application.

Based on such an output, the number of units required to give a large annual production of carbon black need not be large.

As mentioned hereinbefore, when large diameter reactors are used, the tangential gas velocity must be correspondingly greater in order to obtain sufficient centrifugal force to make certain that the protective layer be maintained adjacent the side walls.

The amount of heat needed at the center of the chamber may be provided by adjustment of the air pressure in the porous tube 16. The tube must, of course, be sufficiently porous to permit passage of the necessary amount of air. The upper limit of tube porosity may well be a mechanical consideration, since as porosity increases the strength of a porous tube will decrease.

In case more air is needed for this porous tube combustion than can be forced through the tube walls by reasonable pressures, the porous tube may be perforated. Such a tube is shown diagrammatically in Figure 4. The general tube size and shape may be similar to that of tube 16 of Figure 1. The perforations 25 of the porous tube of Figure 4 may be sufficient in number and of such size as to permit passage of sufficient air for the problem at hand. It is a difficult problem to attempt to determine with any degree of accuracy the exact number and size of holes necessary to furnish exactly the required amount of air. Thus, for any given furnace or reactor size it is best to determine these points as well as the exact amount of air by the trial and error method. It will be obvious to one skilled in such art that tube porosity and size and number of the small holes may vary within rather wide limits. The final adjustment for air volume is made by adjustment of the pressure of the inlet air. These holes 25 can be directed downstream with respect to reactant hydrocarbon flow, as illustrated in Figure 4, or they may be directed radially or at right angles or thereabouts, to the reactant hydrocarbon flow. The direction of the holes and the velocity of the air passing through these perforations are variables which can be used as means of controlling mixing between the air and the reactant hydrocarbon. In any case, however, the velocity should be high enough to maintain a pressure differential between the inside of tube 16 and reaction zone 10 and sufficiently high to cause diffusion of sufficient air through the tube wall to prevent carbon deposition on its exterior surface; the prevention of such carbon deposition, however, is an incidental function of the diffusing air. The small stream of air from each hole forms an inverted flame in the body of reactant hydrocarbon. This is an especially desirable feature because a large area of flame is created for furnishing heat to the reactant hydrocarbon by radiation and convection.

Still a different type of tube may be used for supplying relatively large amounts of air is shown in Figure 5. This tube may usually be of smaller diameter than such a tube as shown in Figure 1 or 4. This open end tube may be relatively short and actually extend into the reaction chamber only a few inches for delivery of air into the central portion of the hydrocarbon undergoing conversion to carbon black.

Since additional air is needed most in the upstream end of the reactor where the concentration of unreacted hydrocarbons is highest, these porous tubes need not extend the full length of the reactor.

The air added by means of diffusion tubes may be preheated, if desired, to make it more effective.

In reactors of exceedingly large diameter, several diffusion tubes distributed in the central region of the reactor can be used.

In case a natural gas is used as the reactant hydrocarbon, that is, as the source of carbon, this material may be preheated to temperatures as high as 1300° to 1400° F. or even higher, as for example, 2000° F. The temperature limit for the preheating step may depend at least somewhat on material available. The above mentioned lower preheat temperatures may be obtained by the use of ordinary steel tubes, but for higher temperatures special alloy tubes may be necessary and these latter may be difficult to obtain in view of the present wartime shortages.

In case the reactant hydrocarbon is a liquid oil, as for example a recycle gas oil such as that disclosed in my copending application, of which this application is a continuation-in-part, a still different preheating apparatus and operation may be used. For the oil, the heating tubes may be of common material since the oil is not usually heated to an excessively high temperature. The oil will usually be heated to a temperature some degrees above its boiling range under say, 100 pounds more or less. The oil leaves the preheater in the liquid state and passes through a pressure reduction valve just prior to the introduction into the reactor. Upon reduction of pressure it is intended that the oil will fully vaporize, hence the oil is preheated sufficiently that this complete vaporization can occur. I have found that in some cases the pressure may be low and the oil allowed to vaporize to a considerable extent in the preheat tubes.

A preheating furnace or preheater is shown diagrammatically in Figure 1 and is referred to by numeral 32. Numeral 30 refers to the air inlet, numeral 28 to the air heating coil, which pipe 22 leads preheated air to the reactor furnace and the porous tube 16.

Pipe 31 conducts reactant hydrocarbon from a source, not shown, to a coil 29 while pipe 21 leads the heated hydrocarbon to the reactor furnace.

A bridge wall or partition 33 separates the air preheating section from the hydrocarbon preheating section since these two materials may need be preheated to different temperatures. The hydrocarbon heating coil may need be one for preheating liquid hydrocarbon, as for example, the recycle gas oil mentioned hereinbefore, under pressure. When such an oil is used, then pipe 21 carries an expansion valve so that when the preheated liquid passes it may be vaporized previous to entry into the reactor. In case a gaseous reactant hydrocarbon is used, heating coil 29 is then one adapted for transfer and heating a gas.

The tangentially added fuel-air mixture may be preheated somewhat, if desired. However, it is preferable to preheat the tangential fuel gas and the tangential air separately and mix these heated materials at a point as near the tangential burner as possible. When introducing only air through the tangential burners as herein described, this air may be advantageously preheated to accelerate or improve its combustion supporting properties. That is, preheated air is more effective for obtaining high furnace temperatures than is cold air, also less reactant hydrocarbon need be consumed for production of the heat of reaction of hydrocarbon to carbon. The ultimate result of this air preheating is a greater yield of carbon black per unit of reactant hydrocarbon.

To place a reactor furnace into operation, beginning with a cold furnace, a small amount of hydrocarbon gas is passed in through the tangential burners and ignited. As soon as ignited the gas may be increased somewhat and at the same time air is added to make the combustion self supporting. As the furnace becomes heated, the tangential fuel and air may be increased so as to reach ultimately the carbon black forming temperature. When this temperature is reached reactant hydrocarbon is turned on so that same may enter the chamber by way of the annular space 18, of Figure 1. Immediately air may be admitted to the porous tube so that carbon will not be deposited on its exposed surface. After operation in this manner for at least a short time, the fuel gas may, if desired be closed off permitting only air to enter through the tangential burners. Under such conditions, then, a portion of the reactant hydrocarbon is consumed by this tangential air in furnishing the protective layer of flame and combustion products and for furnishing a large portion of the heat necessary to promote the reaction of hydrocarbon to carbon. The air passing through the walls of the diffusion tube also consumes some reactant hydrocarbon in furnishing heat for the reaction. The passage of air through the pores of the porous tube acts in a mechanical way to prevent deposition of carbon thereon.

This above explanation of steps to be followed in starting the operation of a reactor furnace is not intended to be a limiting factor, since the method of starting a furnace and continuing its operation once started, may be varied within rather wide limits. The best methods for such operations are usually those learned by experience, and by my explanation I have intended only to suggest a starting point. An operator skilled in the operation of such furnaces will soon learn the fine points necessary for the production of maximum yields of carbon black of optimum quality.

Figure 3 illustrates an embodiment of reactor furnace in which the porous tube air enters by way of a porous tube 26 and the reactant hydrocarbon enters by way of a plurality of inlet openings 27. The number of these inlet openings is not intended to be limited to four as shown, but may be less than four, or more than four, as for example, six or eight. All that is necessary is to provide for a reasonably uniform distribution of reactant hydrocarbons around the porous tube as a center. Still other methods or apparatus or shapes of inlet tubes may be used providing there is a fairly uniform distribution of reactant materials.

Porous tubes useful for the purpose disclosed are not intended to be limited to the embodiments hereinbefore described since many other modifications may serve the purpose equally well. For example, the tube shown in section in Figure 4 contains perforations through which air passes in addition to that which passes through the tube "pores." These openings or perforations 25 are so positioned that air passing therethrough flows out at right angles to the porous tube surface. They may, however, be pointed in any direction found desirable.

It might seem inconsequential when one changes to a larger size reactor furnace, but my experience has shown this point to be one of extreme importance. For example, when changing the length of a $9\frac{1}{2}$ inch diameter reactor from 4 feet to 6 feet the process became inoperable as regards a given type of carbon black made with the 4 foot furnace until a full reconsideration regarding operating conditions was given, and even some points of furnace design had to be revised.

Materials of construction may well be selected from those commercially available providing, of course, they serve the intended purpose. Many auxiliary and minor, yet important parts, such as valves, meters, pipes, etc. have been omitted for purposes of simplicity.

While the above description is full and detailed, I do not wish to limit my invention thereby. Similiarly, I do not wish to limit my invention by any theory or suggestion as to possible reasons why a large size reactor will function as explained.

As will be understood by those skilled in the art many variations and modifications in reactor design and in methods of operation may be made without departure from the spirit and intended scope of my invention.

What I claim is:

1. A furnace for producing carbon black comprising in combination a hollow cylindrical furnace body having one end closed by an end wall, one end open, a perforate tube having a plurality of perforations in the side wall thereof disposed within said hollow furnace body and along the longitudinal axis thereof a substantial distance to act as a flame holder and having one end rigidly disposed within the end wall of said furnace body, means attached to said one end of said perforate tube for introducing air into said perforate tube, a burner tube extending through the side wall of said furnace body near the end wall thereof, the longitudinal axis of said tube being tangent to the inner cylindrical wall of said furnace body, gas inlet means disposed around said perforate tube in the end wall of said furnace and means to inject gas in the form of an annulus through said gas inlet means into the furnace concentric with the axis thereof.

2. The furnace of claim 1 in which the gas inlet means comprises an annular inlet member concentric to, and surrounding said perforate tube.

3. The furnace of claim 1 in which the gas inlet means comprises a plurality of tubular gas inlet members spaced in a circle around the perforate tube as a center.

4. A furnace for producing carbon black comprising in combination a hollow cylindrical furnace body having one end closed by an end wall, one end open, a perforate tube having a plurality of perforations in the side wall thereof disposed within said hollow furnace body and along the longitudinal axis thereof a substantial distance to act as a flame holder and having one end rigidly disposed within the end wall of said furnace body, means attached to said one end of said perforate tube for introducing air into said perforate tube, a plurality of burner tubes extending through the side wall of said furnace body, the longitudinal axes of said tubes being tangent to the inner cylindrical walls of said furnace body, one of said plurality of burner tubes positioned adjacent the closed end wall of said furnace and a second of said plurality of burner tubes positioned adjacent the end of said perforate tube, gas inlet means disposed around said perforate tube in the end wall of said furnace and means to inject gas through said gas inlet means in the form of an annulus into said furnace concentric with the axis thereof.

5. The furnace of claim 4 in which the gas inlet means comprises an annular inlet member concentric to, and surrounding said perforate tube.

6. The furnace of claim 4 in which the gas inlet means comprises a plurality of tubular gas inlet members spaced in a circle around the perforate tube as a center.

7. A furnace for producing carbon black comprising in combination a hollow cylindrical furnace body having one end wall and the other end open, a long perforate tube having a plurality of perforations in the side wall thereof rigidly supported and disposed along the longitudinal axis of and within said hollow furnace body a substantial distance to act as a flame holder, said tube having one end closed and the other end extending into a cylindrical opening in said end wall, means attached to said other end of said perforate tube for injection of free-oxygen containing gas thereinto; said cylindrical opening, said perforate tube and said furnace body having a common longitudinal axis, said cylindrical opening in the end wall having a greater diameter than the outside diameter of said perforate tube and providing an annular space therebetween, means attached to the outer end of said cylindrical opening in said end wall for injection of gas into said annular space; a second tube extending through the sidewall of said furnace body near said end wall, the longitudinal axis of said second tube disposed tangent to the inner cylindrical wall and in a plane perpendicular to the longitudinal axis of said furnace body.

8. A furnace for producing carbon black comprising in combination a hollow cylindrical furnace body having one end wall and the other end open, a long perforate tube having a plurality of perforations in the side wall thereof rigidly supported and disposed along the longitudinal axis of and within said hollow furnace body a substantial distance to act as a flame holder, said tube having one end closed and the other end extending into a cylindrical opening in said end wall, means attached to said other end of said perforate tube for injection of free-oxygen containing gas thereinto; said cylindrical opening, said perforate tube and said furnace body having a common longitudinal axis, said cylindrical opening in the end wall having a greater diameter than the outside diameter of said perforate tube and providing an annular space therebetween, means attached to the outer end of said cylindrical opening in said end wall for injection of gas into said annular space; a plurality of tubes extending through the sidewall of said furnace body, the longitudinal axis of each tube of said plurality of tubes disposed tangent to the inner cylindrical wall and in a plane perpendicular to the longitudinal axis of said furnace body, at least one tube of said plurality of tubes disposed adjacent the end wall of said furnace body and a second tube of said plurality of tubes positioned adjacent the closed end of said elongated perforate tube.

9. A carbon black furnace comprising a hollow cylindrical chamber having one closed end, means comprising an elongated porous tube disposed centrally in said chamber adjacent said end for introducing a central core of gas, means for introducing a stream of gas in a direction tangent to the inner walls of said chamber and in a plane perpendicular to the longitudinal axis thereof so as to form an outer layer of gas, and means for introducing an annular column of gas between said central core and outer layer.

10. A process of making carbon black which comprises introducing a free oxygen-containing gas through an elongated porous tube centrally disposed at the inlet end of an elongated cylindrical furnace chamber and axially aligned therewith, introducing reactant hydrocarbon gas from a point concentric with said tube in a direction parallel therewith so as to substantially surround said free-oxygen containing gas with said hydrocarbon gas, introducing further free oxygen-containing gas into the chamber near the inlet end wall through a burner tube, said burner tube being so positioned as to direct the flow of said free oxygen-containing gas in a direction tangent to the inner surface of the side wall and with the predominating component of motion in a plane perpendicular to the longitudinal axis of the chamber, burning the free oxygen-containing gases with the reactant hydrocarbon to maintain the temperature of the reaction chamber at substantially carbon black-forming temperature, the free oxygen-containing gas being introduced through said burner tube at sufficiently high velocity and in sufficient quantities as to maintain by centrifugal force flame and combustion products adjacent the whole inner surface of the chamber side wall, thus forming a separating layer of said flame and combustion products between the side wall and the reactant mixture in the chamber, cooling the effluents of the reaction chamber to below the carbon black-forming temperature, and separating the carbon black from the products of combustion.

11. A process according to claim 10, wherein the free oxygen-containing gas introduced tangentially to the inner surface of the side wall of the chamber comprises a fuel and air mixture.

12. A process according to claim 10, wherein the free oxygen-containing gas introduced tangentially to the inner surface of the side wall of the chamber comprises air alone.

13. A furnace for producing carbon black comprising in combination a hollow cylindrical furnace body having one end wall, one end open and a perforate tube mounted in said end wall and extending along the axis of said body, said perforate tube terminating in a closed end at a midpoint axially of said furnace body, means connected to said perforate tube for supplying free-oxygen containing gas thereinto, an annular gas inlet means comprising a tubular member disposed axially with respect to said furnace body in the end wall thereof, said tubular member being concentric with and outside of said perforate tube and forming an annulus therebetween, means connected to said gas inlet means for supplying gas thereinto, a burner tube extending through the side wall of said furnace body near said closed end, the longitudinal axis of said burner tube being tangent to the inner cylindrical wall of said body and in a plane perpendicular to the axis of said furnace and means connected to said burner tube supplying free-oxygen containing gas thereinto.

14. A furnace for producing carbon black comprising in combination a hollow cylindrical furnace body having one end wall, one end open and a perforate tube mounted in said end wall and extending along the axis of said body, said perforate tube terminating in a closed end at a midpoint axially of said furnace body, means connected to said perforate tube for supplying free-oxygen containing gas thereinto, an annular gas inlet means comprising a tubular member disposed axially with respect to said furnace body in the end wall thereof, said tubular member being concentric with and outside of said porous tube and forming an annulus therebetween, means connected to said gas inlet means for supplying gas thereinto, a plurality of tubes extending through the side wall of said furnace body, the longitudinal axis of each tube of said plurality of tubes disposed tangent to the inner cylindrical wall of said furnace body and in a plane intersecting the longitudinal axis of said furnace body at right angles, at least one tube of said plurality of tubes disposed near said end wall and another disposed at a midpoint longitudinally of said furnace body and means connected to said burner tubes supplying free-oxygen containing gas thereinto.

15. The process of producing carbon black in a cylindrical zone comprising introducing a column of combustion-supporting gas centrally of said zone, introducing axially of said zone an annular column of reactant hydrocarbon surrounding said central column, introducing a helically rotating annular column of combustion-supporting gas into said zone surrounding said annular column of axially introduced reactant hydrocarbon, stabilizing the central column of combustion-supporting gas as to position by guiding the same by diffusion through a perforate tube disposed axially throughout much of the longitudinal extent of said zone, burning some of said reactant hydrocarbon thereby converting some of said reactant hydrocarbon to carbon black and collecting said carbon black for use.

JOSEPH C. KREJCI.

REFERENCES CITED

The following references are of record in the file of this patent:

UNITED STATES PATENTS

| Number | Name | Date |
|---|---|---|
| 1,433,059 | Anderson | Oct. 24, 1922 |
| 1,773,002 | Hunt | Aug. 12, 1930 |
| 1,925,131 | Brownlee | Sept. 5, 1933 |
| 1,999,541 | Keller | Apr. 30, 1935 |
| 2,117,968 | Lutherer | May 17, 1938 |
| 2,153,951 | Barber | Apr. 11, 1939 |
| 2,292,355 | Ayers | Aug. 11, 1942 |
| 2,368,827 | Hanson et al. | Feb. 6, 1945 |
| 2,375,795 | Krejci | May 15, 1945 |